(12) United States Patent
Haedicke et al.

(10) Patent No.: US 8,845,199 B2
(45) Date of Patent: Sep. 30, 2014

(54) SOLID BRONZE BEARING WITH HARDNESS GRADIENT

(75) Inventors: Lukas Haedicke, Gmunden (AT); Falko Langbein, Gmunden (AT)

(73) Assignee: Miba Gleitlager GmbH, Laakirchen (AT)

( * ) Notice: Subject to any disclaimer, the term of this patent is extended or adjusted under 35 U.S.C. 154(b) by 12 days.

(21) Appl. No.: 13/495,068

(22) Filed: Jun. 13, 2012

(65) Prior Publication Data

US 2013/0188898 A1    Jul. 25, 2013

(30) Foreign Application Priority Data

Jan. 20, 2012 (AT) .................................. A 60/2012

(51) Int. Cl.
*F16C 9/00* (2006.01)
*F16C 9/02* (2006.01)
*F16C 33/00* (2006.01)

(52) U.S. Cl.
USPC ............................ 384/457; 384/294; 384/625

(58) Field of Classification Search
USPC ......... 384/276, 278, 280, 284, 294, 456, 457, 384/625; 148/714, 906; 428/610
See application file for complete search history.

(56) References Cited

U.S. PATENT DOCUMENTS

| 2,615,768 | A | * | 10/1952 | Schluchter | 384/284 |
| 3,425,112 | A | | 2/1969 | Roemer | |
| 6,746,154 | B2 | * | 6/2004 | Greene et al. | 384/276 |
| 6,854,183 | B2 | * | 2/2005 | Greene et al. | 29/898.058 |
| 7,541,086 | B2 | * | 6/2009 | Gartner et al. | 428/212 |
| 8,007,178 | B2 | * | 8/2011 | Perrin et al. | 384/276 |
| 8,440,322 | B2 | * | 5/2013 | Suga et al. | 428/647 |
| 2007/0065067 | A1 | | 3/2007 | Gartner et al. | |
| 2013/0216169 | A1 | * | 8/2013 | Zidar | 384/276 |

FOREIGN PATENT DOCUMENTS

| AT | 502 546 | 4/2007 |
| CN | 102166650 | 8/2011 |
| DE | 1 527 549 | 7/1970 |
| DE | 2 053 696 | 5/1972 |
| DE | 10 2006 021 132 | 11/2007 |
| GB | 1 365 354 | 9/1974 |

* cited by examiner

*Primary Examiner* — Thomas R. Hannon
*Assistant Examiner* — Adam D Rogers
(74) *Attorney, Agent, or Firm* — Collard & Roe, P.C.

(57) ABSTRACT

The invention relates to a method for the production of an anti-friction bearing element (1) comprising a carrier metal which forms a back bearing side and a bearing metal, wherein the carrier metal is made from a bronze-based alloy. The bearing metal is also made from a bronze-based alloy, wherein the hardness of said bronze-based alloy is reduced at least in some areas by heat treatment, so that in the radial direction of the anti-friction bearing a hardness gradient is formed with increasing hardness in the direction of the back side (7) of the anti-friction bearing element (1).

8 Claims, 4 Drawing Sheets

SOLID BRONZE BEARING WITH HARDNESS GRADIENT

CROSS REFERENCE TO RELATED APPLICATIONS

Applicants claim priority under 35 U.S.C. §119 of Austrian Application No. A 60/2012 filed on Jan. 20, 2012, the disclosure of which is incorporated by reference.

BACKGROUND OF THE INVENTION

1. Field of the Invention

The invention relates to a method for producing an anti-friction bearing comprising a carrier metal, which forms a back bearing side, and a bearing metal, wherein the carrier metal is made from a bronze-based alloy, and an anti-friction bearing comprising a carrier metal, which forms a back bearing side, and a bearing metal, wherein the carrier metal is made from a bronze-based alloy.

2. Description of the Related Art

On the one hand future engines will require higher strengths for bearing shells, i.e. for the bearing metal. On the other hand however they also need to have suitably effective tribological properties which are provided in part by additional coatings, good damping properties and sufficient adaptability of the complete bearing system to the shaft or the bearing pin. Known multi-layered anti-friction bearings address these various problems by having different layer systems, for example a steel back as a carrier layer and a bearing metal layer applied on top, for example with an aluminium base, and possibly a running layer applied over this. In the prior art the property profile of an anti-friction bearing is determined and defined by the selection of the individual layers.

However, for particular applications, in particular in order to control fretting problems more effectively, a back bearing layer with a non-ferrous metal base is required. The back metal layer is in direct contact with the bearing mount after the installation of the anti-friction bearing half shell. In this case owing to cyclical, unwanted relative movements of the components to one another at very low amplitude on the contact surfaces between the bearing and bearing mount, particularly with highly loaded connecting rod bearings, frictional welding or friction corrosion may occur, i.e. localised damage, and thereby the "seizure" of the anti-friction bearing in the bearing housing. This damage mechanism is referred to generally as fretting.

It is known to use bronze alloys for the back metal layer instead of steel. For example, AT 502 546 A1 describes a back metal layer made from copper alloys, such as brass or bronze.

It is also known from the prior to make bearing metal layers out of bronze. For example DE 20 53 696 A describes an anti-friction bearing consisting of at least two layers made of metal materials, one layer of which is configured as a running layer facing the bearing pin, whereby the running layer is configured as a hard layer of low thickness and is underlaid by a layer or a material of much lower hardness. Said material can be a lead bronze, a tin bronze, a lead-tin-bronze, an aluminium alloy or pure aluminium.

The bronze alloy needs to be of high strength when in use as a back metal layer, in order to ensure that it fits well into the bearing mount. Furthermore, this high strength has a negative effect in single layer bearings, i.e. anti-friction bearings, in which the back metal layer also forms the running layer or bearing metal layer, on the damping properties and the adaptability of the anti-friction bearing.

DE 15 27 549 B describes a semi-finished product for producing anti-friction bearing shells with an evenly formed thin running layer in the form of plates cut from double-layered or multi-layered composite material which are shaped into semi-cylindrical bearing shells by exerting pressure on the joint faces, wherein the composite material to be worked into bearing shells with varying average strengths over its width, averaged over the material thickness, is configured so that at points at which thickened areas are to be expected during the shaping of the composite material by compression there are increased average strengths. The composite material can be subjected to treatment by heat and/or rolling to make areas of varying strength.

In this way a semi-finished product is made available for producing anti-friction bearing shells, in which the thickened areas occurring during the shaping of the anti-friction bearing shells are avoided from the start on the carrier layers that are the basis of the strength of the bearing. In this way with simple composite bearings the running layer to be applied prior to the shaping of the bearing, for example a white metal layer, can be made thinner to increase the permanent impact strength of the bearing. The invention is intended to make it possible with triple-material bearings to apply the later running layer of the bearing prior to its shaping, in order in this way to avoid the necessity of galvanic application and its associated increased production costs and restriction to galvanically applicable alloys. The intermediate layer in the anti-friction bearings described in this patent can be made of bronze. Thus according to this document it is also necessary to have a multi-layered structure for the anti-friction bearing.

SUMMARY OF THE INVENTION

The objective of the present invention is to create an anti-friction bearing, which shows less of a tendency to fretting and has a simple structure.

This objective is achieved by the aforementioned method and by the aforementioned anti-friction bearing, wherein according to the method the bearing metal is also made from a bronze-based alloy and the hardness of said bronze-based alloy is reduced at least in part by a heat treatment, so that in the radial direction of the anti-friction bearing a hardness gradient is formed with increasing hardness in the direction of the back bearing side of the anti-friction bearing, and wherein with the anti-friction bearing the bearing metal is also made from a bronze-based alloy, and said bronze-based alloy has a hardness gradient with increasing hardness in the direction of the back bearing side.

It is an advantage here, since both the carrier metal, i.e. the back bearing metal layer and the bearing metal that forms the bearing metal layer, are made from a bronze-based alloy, that the material compatibility is very high and thereby the strength of the bond can be improved. By means of the hardness gradient formed by the heat treatment at least in parts it is possible for the bronze-based alloy to be hard itself, whereby corresponding advantages can be achieved in respect of the fretting problem, and the bronze-based alloy on the anti-friction surface, i.e. the surface, on which the component to be supported slides during operation, has a reduced hardness at least in parts and thereby can better perform the tasks of damping and adaptability. The greater hardness of the bronze-based alloy on the back side, in particular also with respect to the bronze-based alloy forming the carrier metal and its hardness is advantageous with respect to the fretting problems, as thereby said layer can also be made to be harder.

In the preferred embodiment variant of the invention the carrier metal and the bearing metal are designed as one layer and made from a single bronze-based alloy. It is an advantage that the demands made on the anti-friction bearing can only be met by a single layer, so that it is possible to design the anti-friction bearing as a solid bronze bearing, i.e. as a mono-metal bearing element. In this way the production of such anti-friction bearings can be simplified, as it is no longer necessary to form material bonds. As a result problems relating to the occurrence of delamination can be avoided.

The heat treatment is preferably performed by means of a laser or by induction heating. Thus in a simple manner specific areas of the surface of the anti-friction bearing can be treated without heat treatment having to be performed over a large area, although this is also possible by means of these methods. Thus it is possible with this embodiment variant of the method to subject only those areas of the anti-friction bearing surface to a heat treatment and thereby reduce the hardness of the alloy, which are necessary for the tribological properties of the anti-friction bearing, so that the bronze-based alloy in the remaining areas still has a greater hardness, and thereby the anti-friction bearing can be designed to be more resistant to mechanical loads.

According to a further embodiment variant of the method it is possible that during the heat treatment in an area close to the surface an additional alloy element is introduced into the bronze-based alloy. Thereby an additional adjustment of the anti-friction surface is possible with regard to its hardness, in particular to the reduction of the hardness of the anti-friction surface. By means of the inclusion of this at least one alloy element simultaneously with the heat treatment the processing time for making the anti-friction bearing can also be shortened.

According to another embodiment variant of the method the heat treatment is performed by means of a heat treatment device, which during the heat treatment sweeps over the surface of the bronze-based alloy at a speed selected from a range of 1 m/min to 8 m/min. In this way a greater homogeneity of the property profile can be improved in the treated area.

It is also possible for the anti-friction bearing load to be simulated on an electronic data processing system, for the pressure distribution in the anti-friction bearing to be determined and for the hardness gradient to be adjusted to the pressure distribution accordingly. In this way it is possible to achieve specific areas of reduced hardness in the anti-friction bearing, whereby said areas of reduced hardness can only be restricted to the area with low pressure loading, so that the remaining areas retain the greater hardness of the basic material and thereby the anti-friction bearing can better withstand higher loads.

According to one embodiment variant of the anti-friction bearing, on an anti-friction surface of the bronze-based alloy opposite the back bearing side in the direction of a radial bearing cross section a running-in layer or an anti-friction paint layer is provided, in order in this way to improve the running-in behaviour, i.e. adjustment of the geometry of the anti-friction bearing surface to the surface of the mounted component. In the case of only partial hardness reduction, in this embodiment variant it is also the case that the running-in layer or the anti-friction paint layer is provided partly on a hard background so that the running-in layer or the anti-friction paint layer, if they are not to be worn away in these areas during the running-in, can also be effective in operation even over a longer period, even if the running-in layer or the anti-friction paint layer have a much lower hardness.

The hardness gradient can be formed up to a layer depth selected from a range of 0.5 mm to 5 mm. In this way it can be achieved on the one hand that in the bottom layer depth area the anti-friction bearing is largely configured to be harder as viewed in radial direction, whereby the anti-friction bearing better withstands higher loads. On the other hand it is possible in the top layer depth area, to allow the hardness gradient to move more fluently into the harder zone of the anti-friction bearing, whereby an abrupt change in the properties of the anti-friction bearing is avoided. It is thereby possible to provide the anti-friction bearing with better emergency running properties if the softer areas of the anti-friction bearings are partly worn.

The term "bottom layer depth area" means the range of 0.5 mm to 0.9 mm. The top layer depth area refers however to a layer depth of 0.9 mm to 5 mm.

It is also possible for the hardness gradient to be formed in the area of the longitudinal end faces of the anti-friction bearing layer with a greater layer depth than in a middle area. In this embodiment variant of the anti-friction bearing the known edge carrier problem of anti-friction bearings can be addressed more effectively. The advantage of the adaptability of the anti-friction bearing as a result of the heat treatment is also evident here, as this design of the anti-friction bearing can be represented simply by means of the heat treatment without special mechanical processing or complex layer structures being necessary.

As already explained above the hardness gradient can only be formed in discrete areas, so that areas of greater hardness are provided on the anti-friction surface.

The discrete areas can be in the form of strips, whereby an embodiment variant of the groove bearing known from the prior art can be represented simply.

Preferably, in the heat-treated areas by means of the heat treatment the structure of the bronze-based alloy is changed, whereby in the heat-treated areas a cast structure is produced and the anti-friction bearing in the non-heat-treated areas has a rolling structure. In particular, this embodiment of the anti-friction bearing has proved in practice to be particularly advantageous with regard to the tribological behaviour.

Preferably, in this embodiment variant of the anti-friction bearing the bronze-based alloy in the heat-treated area has a grain size of a maximum of 1,000 μm, whereby a further improvement of the tribe-corrosion behaviour can be achieved, as by means of the large grain size the grain limit density in the heat-treated area is reduced. The grain limit corrosion, in particular in the surface area, can be limited in this way.

BRIEF DESCRIPTION OF THE DRAWINGS

For a better understanding of the invention the latter is explained in more detail with reference to the following Figures.

In a schematically simplified view.

DETAILED DESCRIPTION OF THE PREFERRED EMBODIMENTS

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

Figure 1:
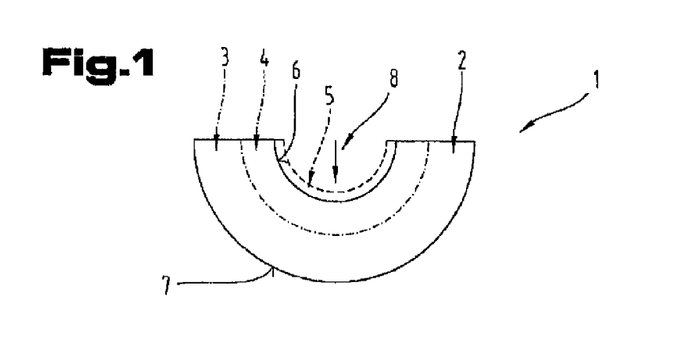
FIG. 1 shows an anti-friction bearing half shell in side view.

FIG. 1 shows an anti-friction bearing element 1 in the form of an anti-friction bearing half shell.

The unclosed anti-friction bearing element 1 can have, in addition to the half shell design with an angular overlap of at least almost 180°, a different angular overlap, for example of at least approximately 120° or of at least approximately 90°, so that the anti-friction bearing element 1 can also be configured as a third of a shell, in particular for two-stroke diesel engines, or as a quarter shell, which can be combined with corresponding additional bearing shells in a bearing mount, wherein the anti-friction bearing element 1 according to the invention is preferably installed into the more highly loaded area of the bearing mount.

However, other embodiment variants of the anti-friction bearing element 1 are also possible, for example an embodiment as a bearing bush.

The anti-friction bearing element 1 comprises or consists of an anti-friction bearing layer 2 which forms a support element or a support shell for the anti-friction bearing element 1, so that the latter is self-supporting. At the same time said anti-friction bearing layer 2 also forms the anti-friction layer so that the anti-friction bearing element 1 in the simplest embodiment variant can also be a referred to as a mono-metal bearing element or single layer bearing element.

The anti-friction bearing layer 2 consists of a bronze-based alloy, as explained in more detail in the following.

According to another embodiment variant of the anti-friction bearing element 1 it is possible for the anti-friction bearing layer 2 to consist of a first part layer 3 and a second part layer 4 or comprises the latter, as shown by dash-dot lines in FIG. 1. The first part layer 3 in this case forms the protective shell and the second part layer 4 forms the anti-friction layer of the anti-friction bearing element 1.

In this case the anti-friction bearing element 1 is made completely of bronze-based alloys, although the compositions of the bronze-based alloy for the first part layer 3 is different from the bronze-based alloy of the second part layer 4.

FIG. 1 shows with a dashed line a further embodiment variant of the anti-friction bearing element 1, in which the anti-friction bearing layer 2, which if possible can also comprise the two part layers 3, 4, can be provided at least in some parts, particularly in the tribologically stressed areas, or as shown over the whole surface with a running-in layer 5 or an anti-friction paint layer, which can also be a running-in layer and is joined to the anti-friction bearing layer in the region of an anti-friction surface 6. The anti-friction surface 6 is the surface of the anti-friction bearing element 1 that is configured to face a component to be mounted, i.e. in articular shaft, and is configured to be opposite a back side 7 of the anti-friction bearing element 1 along a radial direction according to arrow 8.

The running-in layer 5 can possibly also be made of a bronze-based alloy, whereby in this case said bronze-based alloy has a lower hardness than the bronze-based alloy or alloys of the anti-friction bearing layer 2.

The running-in layer can however also consist of an alloy known from the prior art for this purpose of adjusting the anti-friction bearing element 1 to the surface of the component to be mounted during the running-in phase.

The anti-friction paint layer can for example be made of an anti-friction paint with a polyamide-imide base with graphite and $MoS_2$ as solid lubricants. However, other anti-friction paints known from the prior art can also be used.

If the anti-friction bearing layer 2 consists of the at least two part layers 3, 4 made of bronze-based alloys, the at least two part layers 3, 4 can be joined together by conventional methods known from the prior art, for example for roller plating or by depositing part layer 4 onto part layer 3 by means of gas phase deposition methods. Preferably in this embodiment variant the at least two part layers 3, 4 are not made from a sintered material but from a solid material.

The running-in layer 5 or the anti-friction paint layer can also be deposited on the anti-friction bearing layer 2 by means of conventional methods known from the prior art.

As already explained above, the anti-friction bearing layer 2 is made from a bronze-based alloy, for example a lead bronze or a lead-tin-bronze. However, preferably the anti-friction bearing layer 2 is lead-free, i.e. so that apart from unavoidable impurities in the raw materials there is no lead in this alloy.

In particular, the anti-friction bearing layer 2 is made from a tin bronze, which in the simplest case in addition to copper as the matrix element consists of tin in a proportion selected from a range with a lower limit of 1.25 wt. % and an upper limit of 12 wt. %, zinc in a proportion selected from a range with a lower limit of 0.25 wt. % and an upper limit of 6 wt. % and phosphorus in a proportion selected from a range with a lower limit of 0.01 wt. % and an upper limit of 0.5 wt. %. In particular, the back metal layer 3 is made of CuSn3-10Zn1-4P0.05-0.2, such as e.g. CuSn5Zn1P0.1, CuSn8Zn1P0.1, CuSn10Zn3P0.1, CuSn8Zn4P0.1 or CuSn3Zn3P0.1. Tin bronzes of these compositions have shown in test runs in engines that in direct contact with the steel of the bearing mount they have a low tendency to frictional welding or fretting, i.e. high resistance to frictional corrosion. These properties of the tin bronze are significantly better than those of steel.

Tin is used as the main alloy element and by mixed crystal hardening controls the basic strength of the copper matrix. At more than 12 wt. % tin however the risk of brittle intermetallic phases forming and the tendency to segregation increases significantly, whereby the structure quality and therefore the properties of the back metal layer are influenced negatively. At less than 1.25 wt. % the desired properties of the tin bronze are not achieved or not to the desired extent.

Zinc can be considered as a replacement for tin. In particular at contents of up to 2 wt. % zinc, tin can be replaced by zinc in a ratio of up to 1:2. Zinc increases the strength while maintaining the toughness of the tin bronze, whereby the alloy can be hot and cold formed easily. Furthermore, zinc provides better deoxidization of the melt, which in turn positively influences the quality of the melt and thereby the quality of the casting material. The zinc content is restricted to a maximum of 6 wt. %, as at higher proportions of zinc the risk of forming intermetallic phases with copper increases.

Phosphorus is mainly used as a deoxidising agent for the melt. Furthermore, with the addition of phosphorus also a slight increase in the tensile strength and the hardness of the tin bronze could be observed, the expansion remaining almost uninfluenced. With a phosphorus content of more than 0.5 wt. % however the casting ability of the tin bronze is made worse.

To improve these effects further preferably the proportion of tin is selected from a range with a lower limit of 3 wt. % and an upper limit of 8 wt. % and/or the proportion of zinc is selected from a range with a lower limit of 1 wt. % and an upper limit of 4 wt. % and/or the proportion of phosphorus is selected from a range with a lower limit of 0.25 wt. % and an upper limit of 0.4 wt. %.

Said tin bronzes have both static and dynamic strengths which are comparable to those of steel.

It is also significant that said tin bronzes can be processed by continuous casting, in particular horizontal continuous casting. They can be cold-formed without damage and also have a sufficient residual forming capacity so that the compression into bearing shells can be performed without additional steps. In addition they can be rolled. With regard to the environment it is significant that the tin bronzes can be lead-free.

Preferably, the total proportion of tin and zinc is a maximum of 15 wt. %.

By restricting the total proportion of tin and zinc to this value the risk of forming intermetallic phases and the risk of segregation are reduced further. In addition, the casting ability of the melt is improved, as melts with a total proportion of tin and zinc of more than 15 wt. % have a very high solidification interval. In addition, the formability of the casting material is improved, which is an advantage particularly with regard to the forming of the flat, strip-like semi-finished product into the shell form.

To improve these effects further preferably the total proportion of tin and zinc is restricted to a maximum of 13 wt. % or the total proportion of tin and zinc is selected from a range with a lower limit of 6 wt. % and an upper limit of 12 wt. %.

In addition to this basic composition of the tin bronze it is also possible that at least one additional alloy element is included to form microalloy systems in the tin bronze or for grain refinement. In addition, a portion of the copper can be replaced by a maximum of 7 wt. % with at least one element from a group comprising cobalt, zirconium, manganese, titanium, magnesium, boron, niobium, vanadium, iron, chromium, scandium and carbon. In this way different structural states can be formed (microalloy system, grain refinement for good forming ability and high strengths, also heat resistance, influence of the tribology through the installation of intermetallic phases as spacers).

In addition, also rare earth metals can generally be included in an amount to a maximum of 0.1 wt. %, in particular a maximum of 0.05 wt. %.

In this way with cobalt or boron it is possible to achieve a finer grain structure of the casting alloy. This property can be increased beyond expectation by adding both cobalt and boron, which is why it is presumed that interaction occurs between cobalt and boron in the melt of the tin bronze.

By means of manganese the cold strength and hot strength of the tin bronze can be improved by mixed crystal solidification. In addition the re-crystallization temperature can be increased.

By adding titanium to the tin bronze the tin bronze can be hardened by means of precipitation hardening. In particular, a grain-refining effect can also be achieved in association with carbon as the carbides act as crystallisation nuclei.

By the addition of magnesium also a precipitation hardening can be achieved by Cu2Mg and thereby an increase in the strength of the tin bronze.

This also applies because of the precipitation phase Cu3Zr to the addition of zirconium, whereby zirconium can also be added to increase the recrystallization threshold of previously cold-hardened tin bronzes. By means of the formation of carbide zirconium can also have a grain-refining effect owing to the formation of crystallization nuclei.

Niobium or vanadium can be added for refining the grain size of the casting structure, whereby an increase in the effect can be achieved with the simultaneous addition of boron.

Iron is also used for refining the grain size of the casting structure, whereby an increase in the effect was observed with phosphorus or the simultaneous addition of nickel.

By adding chromium to the tin bronze the latter can be solidified by thermal hardening, whereby after the age hardening elementary chromium is deposited. No intermetallic bonds are formed between the Cu and Cr, so that by means of the addition of chromium to tin bronze no significant losses in expansion could be established despite the increasing strengths during the age hardening annealing.

Scandium is used to increase the recrystallization threshold after the previous cold forming.

Nickel in connection with phosphorus can be added to increase strength and can be added in small amounts in connection with phosphorus for grain refinement.

Cobalt can be added in a proportion which is selected from a range with a lower limit of 0.01 wt. % and an upper limit of 2.0 wt. % and/or manganese in a proportion which is selected from a range with a lower limit of 0.01 wt. % and an upper limit of 0.5 wt. %, wherein the total proportion of the elements cobalt, zirconium and manganese is preferably selected from a range with a lower limit of 0.02 wt. % and an upper limit of 2.1 wt. %. The possible proportion of zirconium is the total proportion minus the amounts of cobalt and/or manganese.

The amount of cobalt is restricted to a maximum of 2.0 wt. %, in order to avoid segregation during the cooling of the melt, whereby the properties of the back metal layer were worsened by the precipitated phases.

By means of the selected range for the proportion of manganese, manganese can be used on the one hand solely for deoxidisation (with a proportion of between 0.01 wt. % to 0.02 wt. %) or from a proportion of 0.02 wt. % also for increasing the strength of the tin bronze. At proportions of over 0.5 wt. % the strength of the tin bronze is too great.

The proportion of zirconium can be between 0.01 wt. % and 0.3 wt. %, whereby even small amounts (up to about 0.1 wt. %) favour the formation of a heterogeneous structure and thereby contribute to the hardening. In a range of between 0.2 wt. % to 0.3 wt. % a maximum increase of the recrystallization threshold of previously cold-hardened samples was observed. However, even small amounts of zirconium in a range of from 0.02 wt. %-0.03 wt. % can have a grain-refining effect in connection with carbon, as the carbides formed with carbon act as crystallisation nuclei.

The total proportion of cobalt, zirconium and manganese was limited to 2.1 wt. %, as greater proportions of these elements provide no additional positive properties, but rather the processing of the melt is made more difficult, for example because of the mentioned occurrence of segregation.

Preferably, the proportion of cobalt is selected from a range with a lower limit of 0.05 wt. % and a higher limit of 1.5 wt. % and/or the proportion of manganese is selected from a range with a lower limit of 0.1 wt. % and an upper limit of 0.4 wt. % and/or the total proportion of the elements cobalt, zirconium and manganese are selected from a range with a lower limit of 0.02 wt. % and an upper limit of 1.8 wt. %.

Titanium can be added in a proportion selected from a range with a lower limit of 0.05 wt. % and an upper limit of 0.5 wt. % and/or magnesium in a proportion selected from a range with a lower limit of 0.01 wt. % and an upper limit of 0.2 wt. % wherein the total proportion of the elements titanium and magnesium can be selected from a range with a lower limit of 0.05 wt. % and an upper limit of 0.5 wt. %.

Said elements are only alloyed in small amounts in order to simplify the melt-metallurgical processing, in particular with regard to the impurity of the melt with oxides of said metals and the erosion of the melt.

By way of the titanium content different age hardening processes can be caused. With low contents there is continual precipitation, at higher contents there is discontinuous precipitation. The amount of titanium is limited to a maximum of 0.5 wt. %, in order to avoid a reversed block segregation (formation of Ti-concentration gradients) and thereby the setting of uneven properties in the cast piece.

The proportion of magnesium is limited to a maximum of 0.2 wt. %, so as not to worsen the forming ability of the tin bronze.

The total proportion of titanium and magnesium is limited to a maximum of 0.5 wt. %, so that the tin bronze does not get too hard and the forming ability does not suffer.

Preferably, the proportion of titanium is selected from a range with a lower limit of 0.1 wt. % and an upper limit of 0.2 wt. % and/or the proportion of magnesium is selected from a range with a lower limit of 0.05 wt. % and an upper limit of 0.14 wt. % and/or the total proportion of the elements titanium and magnesium is selected from a range with a lower limit of 0.1 wt. % and an upper limit of 0.4 wt. %.

Niobium can be included in a proportion selected from a range with a lower limit of 0.01 wt. % and an upper limit of 0.5 wt. % and/or vanadium can be included in a proportion selected from a range with a lower limit of 0.01 wt. % and an upper limit of 0.25 wt. % and/or iron can be included in a proportion selected from a range with a lower limit of 0.1 wt. % and an upper limit of 2.0 wt. %, wherein the total amount of the elements niobium, vanadium and iron can be selected from a range with a lower limit of 0.01 wt. % and an upper limit of 2.0 wt. %.

For niobium and vanadium, which both have a grain-refining effect, the upper limits were selected with regard to the fact that higher proportions had no additional effect or the additional effect was not achieved to the same extent as with the addition in an amount from the claimed ranges.

The proportion of iron is limited to a maximum of 2 wt. %, as with higher amounts of zinc the forming ability of the tin bronze can form negative iron-zinc-phases, whereby the tin bronze becomes brittle.

For this reason the total amount of these elements is also restricted to a maximum of 2 wt. %, as the negative influence of higher proportions of iron can increase with the simultaneous presence of niobium and/or vanadium.

However, it has been observed that the presence of phosphorus in the tin bronze iron can also have a grain-refining effect with the formation of phosphides, which in turn form crystallization nuclei.

Preferably, the proportion of niobium is selected from a range with a lower limit of 0.1 wt. % and an upper limit of 0.30 wt. % and/or the proportion of vanadium is selected from a range with a lower limit of 0.05 wt. % and an upper limit of 0.16 wt. % and/or the proportion of iron is selected from a range with a lower limit of 0.5 wt. % and upper limit of 1.3 wt. % and/or the total proportion of the elements titanium and magnesium is selected from a range with a lower limit of 0.1 wt. % and an upper limit of 1.5 wt. %.

Chromium can be included in a proportion selected from a range with a lower limit of 0.01 wt. %, in particular 0.1 wt. %, and an upper limit of 1.6 wt. %, in particular 1.2 wt. %.

The upper limit of a maximum of 1.6 wt. % was selected with regard to the possible formation of chromium oxides in the melt, which like titanium or magnesium have a negative influence on the melt-metallurgical production by contaminating the melt and the erosion of the melt.

The proportion of scandium can be a maximum of 0.3 wt. %, as scandium also has a grain-refining effect, and a greater proportion does not show any additional effect.

The proportion of boron can be selected from a range with a lower limit of 0.08 wt. % and an upper limit of 0.15 wt. %, that of carbon from a range with a lower limit of 0.05 wt. % and an upper limit of 0.15 wt. %. As these elements, as already outlined above, were added to increase the grain-refining effect of the said elements, higher amounts of these elements have no additional effect, taking into consideration the amounts of elements whose grain-refining effect is increased.

Preferably, the proportion of boron is selected from a range with a lower limit of 0.1 wt. % and an upper limit of 0.12 wt. % and/or the proportion of carbon is selected from a range with a lower limit of 0.07 wt. % and an upper limit of 0.12 wt. %.

A proportion of the copper can be replaced by nickel in an amount of a maximum of 2 wt. %, in particular a maximum of 1.5 wt. %, since as with iron phosphides can form which as crystallization nuclei have a grain-refining effect. This applies in particular if the proportion of phosphorus is a maximum of 0.25 wt. %.

However, in the preferred embodiment variant of the multi-layered bearing shell the bronze is nickel-free and/or aluminium-free. Fretting trials have shown interestingly that in particular higher amounts of nickel (which would be necessary for a significant increase in strength, e.g. above 2 wt. %, as occur in the copper-nickel-tin alloys hardening spinodal known from the prior art) have a very negative effect on the fretting properties. With respect to aluminium trials have shown that even low amounts in the tin bronze cause increased erosion in the melt-metallurgical production of the bronze.

Although the explanations relate to the composition of the tin bronze for the anti-friction bearing layer 2, the preferred embodiment variant of the invention, other compositions are also possible. For example, the bronze-based alloy can contain up to 15 wt. % in particular between 0.5 wt. % and 8 wt. % aluminium, up to 10 wt. % in particular between 0.1 wt. % and 7.5 wt. % iron, up to 8 wt. % in particular between 0.2 wt. % and 7 wt. % nickel, up to 5 wt. % in particular between 0.5 wt. % and 3.1 wt. % manganese and up to 5 wt. % in particular between 0.5 wt. % and 3.5 wt. % silicon or combinations thereof.

Particularly with aluminium bronzes the addition of small amounts of chromium, titanium, zirconium, selenium and tellurium result in a refinement of the structure and an increase in heat resistance. At least one of these elements can therefore be added to the alloy, wherein the total proportion of these elements is a maximum of 5 wt. %.

If the anti-friction bearing layer 2 is made from the at least two part layers 3, 4, the compositions part layers 3, 4 can be selected from the aforementioned amount ranges, whereby the second part layer 4 is softer than the first part layer 3. Therefore, this needs to be taken in account with regard to the composition of the bronze-based alloy for the second, inner part layer 4. For example, the proportion of tin and/or zinc in the second part layer 4 can be greater than the corresponding proportion in the first part layer 3.

As part of tests on possible, exemplary compositions for the single-layered embodiment variant of the anti-friction bearing layer 2 the following alloys summarised in table 1 were made. All of the details are given in wt. %. The remainder is formed by Cu respectively.

TABLE 1 possible composition of the tin bronze

| Nr. | Sn | Zn | P | Co | Zr | Mn | Ti | Mg | B | Nb | V | Fe | Cr | Sc | C | Ni |
|---|---|---|---|---|---|---|---|---|---|---|---|---|---|---|---|---|
| 1 | 4 | 1 | 0.12 | — | — | 0.05 | — | — | — | — | — | — | — | — | — | — |
| 2 | 4 | 1 | 0.12 | 0.05 | — | 0.05 | — | — | — | — | — | — | — | — | — | — |
| 3 | 4 | 1 | 0.12 | 0.05 | — | — | — | — | — | — | — | — | — | — | — | — |
| 4 | 4 | 1 | 0.10 | — | 0.02 | — | 0.05 | 0.03 | — | — | — | — | — | — | — | — |
| 5 | 4 | 1 | 0.10 | — | — | 0.05 | — | — | — | — | — | — | 0.05 | — | — | — |
| 6 | 4 | 1 | 0.05 | — | 0.03 | — | 0.05 | — | — | — | — | — | — | — | 0.1 | — |
| 7 | 4 | 1 | 0.10 | — | — | 0.05 | — | — | — | — | — | — | — | 0.2 | — | — |
| 8 | 4 | 1 | 0.01 | — | — | — | — | — | 0.1 | 0.05 | — | — | — | — | — | — |
| 9 | 4 | 1 | 0.10 | 0.1 | — | — | — | — | 0.1 | — | — | 0.15 | — | — | — | — |
| 10 | 4 | 1 | 0.12 | 0.05 | — | 0.05 | — | — | — | — | — | 0.15 | — | — | — | 0.10 |
| 11 | 5 | 1 | 0.12 | — | — | 0.05 | — | — | — | — | — | — | — | — | — | — |
| 12 | 5 | 1 | 0.12 | 0.05 | — | 0.05 | — | — | — | — | — | — | — | — | — | — |
| 13 | 5 | 1 | 0.12 | 0.05 | — | — | — | — | — | — | — | — | — | — | — | — |
| 14 | 5 | 1 | 0.10 | — | 0.02 | — | 0.05 | 0.03 | — | — | — | — | — | — | — | — |
| 15 | 5 | 1 | 0.10 | — | — | 0.05 | — | — | — | — | — | — | 0.05 | — | — | — |
| 16 | 5 | 1 | 0.05 | — | 0.03 | — | 0.05 | — | — | — | — | — | — | — | 0.1 | — |
| 17 | 5 | 1 | 0.10 | — | — | 0.05 | — | — | — | — | — | — | — | 0.2 | — | — |
| 18 | 5 | 1 | 0.01 | — | — | — | — | — | 0.1 | 0.05 | — | — | — | — | — | — |
| 19 | 5 | 1 | 0.10 | 0.1 | — | — | — | — | 0.1 | — | — | 0.15 | — | — | — | — |
| 20 | 5 | 1 | 0.12 | 0.05 | — | 0.05 | — | — | — | — | — | 0.15 | — | — | — | 0.10 |
| 21 | 8 | 1 | 0.12 | 0.05 | — | 0.05 | — | — | — | — | — | — | — | — | — | — |
| 22 | 8 | 1 | 0.10 | — | — | 0.05 | — | — | — | — | — | — | 0.05 | — | — | — |
| 23 | 8 | 1 | 0.05 | — | 0.03 | — | 0.05 | — | — | — | — | — | — | — | 0.01 | — |
| 24 | 8 | 1 | 0.12 | 0.05 | — | 0.05 | — | — | — | — | — | 0.15 | — | — | — | 0.10 |
| 25 | 8 | 1 | 0.10 | — | — | 0.05 | — | — | — | — | — | — | — | 0.2 | — | — |
| 26 | 8 | 5 | 0.12 | 0.05 | — | 0.05 | — | — | — | — | — | — | — | — | — | — |
| 27 | 8 | 5 | 0.10 | — | — | 0.05 | — | — | — | — | — | — | 0.05 | — | — | — |
| 28 | 8 | 5 | 0.05 | — | 0.03 | — | 0.05 | — | — | — | — | — | — | — | 0.01 | — |
| 29 | 8 | 5 | 0.12 | 0.05 | — | 0.05 | — | — | — | — | — | 0.15 | — | — | — | 0.10 |
| 30 | 8 | 5 | 0.10 | — | — | 0.05 | — | — | — | — | — | — | — | 0.2 | — | — |

The anti-friction bearing layer 2 is preferably produced by (horizontal) continuous casting as a strip-like starting material that is subsequently rolled. Advantageously, there is no fracture separation.

After the production of the starting material for the anti-friction bearing layer 2 or after shaping the starting material to form the half, third or quarter shell or bushing, the hardness of the bronze-based alloy is reduced at least in some areas by a heat treatment, so that in radial direction of the anti-friction bearing element 1 according to arrow 8 a hardness gradient is formed with increasing hardness in the direction of the back side 7 of the anti-friction bearing element 1.

In addition, different examples are shown in FIGS. 2 to 6, which are not to be considered to be definitive. It is also noted that these figures are merely simplified representations of the principle of the invention.

Figure 2A:
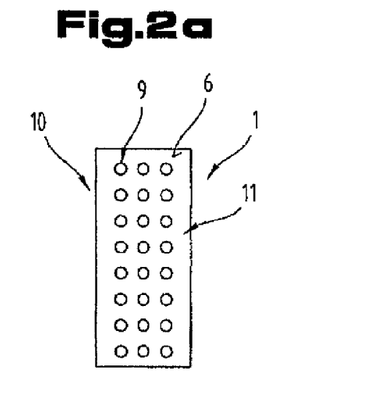
FIG. 2a-FIG. 2d show the plan view of the anti-friction surface of an anti-friction bearing element of various different embodiment variants.
Figure 2B:
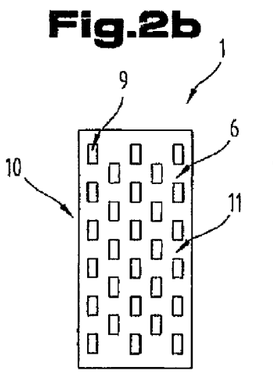
Figure 2C:
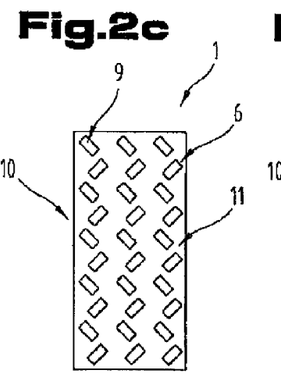
Figure 2D:
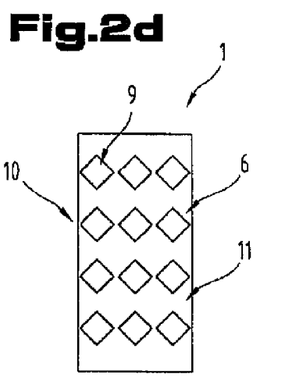
Figure 3:
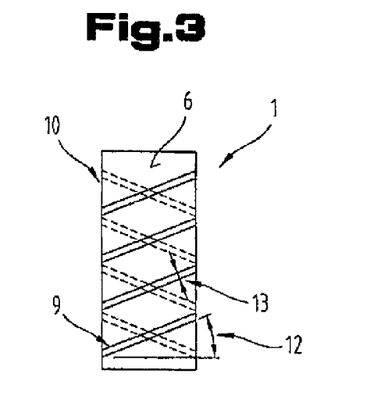
FIG. 3 shows the plan view of the anti-friction surface of an anti-friction bearing element according to a further embodiment variant.

FIGS. 2 to 3 show respectively a plan view of the anti-friction surface 6 of the anti-friction bearing element 1. As shown in these figures areas 9 (or sections) can be formed on the anti-friction surface 6. Said areas have the form of circles (FIG. 2a), wherein a plurality of such discrete areas 9 can be formed distributed over the anti-friction surface 6, for example circles arranged in rows, as shown in FIG. 2. The rows can also be arranged offset to one another, differently from the view in FIG. 2, (FIG. 2b for the configuration in the form of rectangles), for example every second row by a half spacing between the middle points of consecutive circles of a row. The rows are aligned to be parallel or approximately parallel to a longitudinal side edge 10 of the anti-friction bearing element 1. The longitudinal side edge 10 runs in this case in circumferential direction of the anti-friction bearing element. Also zigzag arrangements of discrete areas 9 are possible (FIG. 2c).

Instead of circles also other geometric figures can be formed, for example oval areas 9, in particular with a longitudinal extension in the direction of the longitudinal side edge 10 or squares, rectangles, diamonds (FIG. 2d) etc.

It should be noted that the number of areas 9 shown from FIGS. 2 to 3 is not definitive.

The areas 9 according to the invention have a lower hardness than a non-heat-treated area 11 (or section) adjoining the latter of the bronze-based alloy.

The areas 9 extend in radial direction according to arrow 8 (FIG. 1) in the direction of the back side 7 (FIG. 1) of the anti-friction bearing element 1. The area 9 or the areas 9 is or are configured to be three-dimensional.

In the embodiment variant according to FIG. 3 the areas 9 are configured to be strip-like, whereby in the direction of the longitudinal side edge 10, i.e. in circumferential direction of the anti-friction bearing element 1 a plurality of strip-like areas 9 can be arranged behind one another. The areas 9 run obliquely to the longitudinal side edge 10. Both an angle 12, that the strips can adopt relative to the longitudinal side edge 10, and also a strip width 13 can be adjusted variably to the respective area of use of the anti-friction bearing element 1. For example, the angle 12 can be selected from a range of 5° to a maximum angle, calculated by the formula $\tan^{-1}((L/2)/B)$, wherein parameter L in millimeters describes the length of the anti-friction bearing element 1 in circumferential direction and parameter B in millimeters describes the width of the anti-friction bearing element 1. The strip width 13 can be selected from a range of from 0.5 mm to a maximum width B, wherein the parameter B in millimeters describes the width of the anti-friction bearing element 1.

It is also possible in this case that additional strip-like areas 9 are formed, which also run obliquely to the longitudinal side edge 10, but at a different angle, so that the strip-like areas 9 cross one another, as indicated by dashed lines in FIG. 3. The angle, that these strips can form with the longitudinal side edge 10 adopt the same absolute value or a different value therefrom.

It is also possible to combine strip-like areas 9 with circular areas 9, whereby it should be noted that it is possible in general to combine with one another different geometric shapes of the areas 9 on an anti-friction surface 6.

Figure 4:
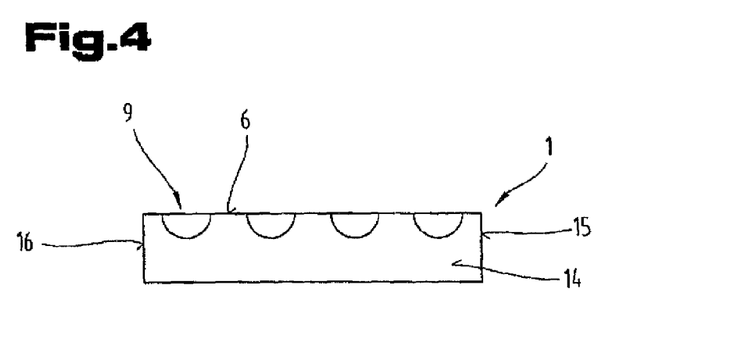
FIG. 4 shows the side view of a semi-finished product for producing an anti-friction bearing element.
Figure 5:
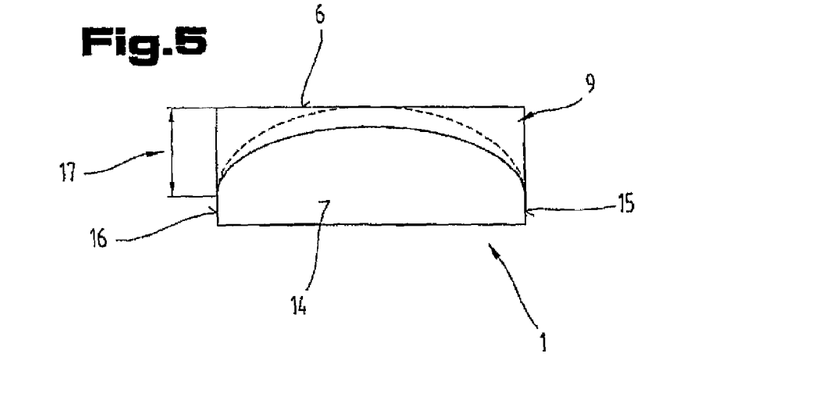
FIG. 5 shows the side view of another embodiment variant of a semi-finished product for producing an anti-friction bearing element.
Figure 6:
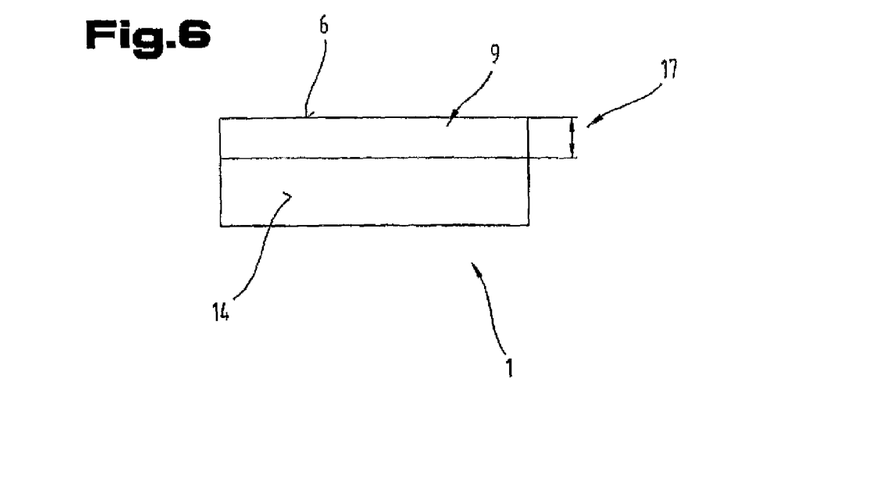
FIG. 6 shows the side view of a further embodiment variant of a semi-finished product for producing an anti-friction bearing element.

FIGS. 4 to 6 show respectively an anti-friction bearing element 1 in the direction of a longitudinal side surface 14, which is aligned in the circumferential direction of the anti-friction bearing element 1. To simplify the representation the anti-friction bearing elements 1 are shown to be planar. Of course, the latter are shaped in the finished state into a corresponding part shell or bush. The representation also clarifies that it is possible within the scope of the invention to form the areas 9 with a relatively low hardness prior to the shaping. However, it should be noted that the shaping can also be performed prior to the heat treatment to form the areas 9.

The embodiment variant according to FIG. 4 is in this case in the form of a grooved bearing and comprises a plurality of strip-like areas 9 arranged behind one another in circumferential direction.

It should be noted at this point that despite the formation of the areas 9 the anti-friction surface 6 in all of the embodiment variants preferably has no depressed or raised areas, although this is possible in principle. For example, the groove-like embodiment variant has no actual grooves, as said "grooves" are "filled" with the bronze-based alloy.

The strip-like areas 9 in the embodiment variant according to FIG. 4 run perpendicular to the longitudinal side surface 14, i.e. in the axial direction of the anti-friction bearing element 1.

It is possible in principle that only one or two such strip-like areas 9 are formed according to FIG. 4, wherein in this case said areas 9 are preferably formed subsequently on end faces 15 and/or 16. The end faces 15, 16 run perpendicular to the longitudinal side face 14.

In the embodiment variant of the anti-friction bearing element 1 according to FIG. 5 only one area 9 of reduced hardness is formed which extends over the entire anti-friction surface 6 of the anti-friction bearing element 1. The area 9 has a layer depth 17 in radial direction according to arrow 8 (FIG. 1). Said layer depth varies over the path in the direction of the longitudinal side surface 14, i.e. from end face 15 up to end face 16, wherein the greatest layer depths on the two end faces 15, 16 are formed so that the area 9 on the lower side, which is opposite the anti-friction surface 6 in radial direction, has a curved path in the direction of the longitudinal side face 14. Preferably, the layer depths 17 on the two end faces 15, 16 are of equal size and the area 9 is designed to be symmetrical.

It is also possible however, as shown by dashed lines in FIG. 5, that the curved lower side extends into the anti-friction surface 6, whereby two discrete areas 9 are formed with a curved lower side, of which one is arranged on one of the end faces 15, 16.

According to one embodiment variant it is possible that the two areas 9 are formed in the region of the longitudinal side faces 14 with a greater depth than in a middle area of the anti-friction surface 6. Said embodiment thus corresponds essentially to the one shown in FIG. 5, whereby however the path of the areas 9 is rotated by 90°.

Lastly, FIG. 6 shows that it is possible in the simplest case that the area 9 can be formed to extend fully over the entire anti-friction surface 6, whereby its lower side is formed to be parallel to the anti-friction surface 6, i.e. the area 9 over the entire surface has at least almost the same layer depth 17.

As already explained above, the area or areas 9 are produced by the heat treatment of the bronze-based alloy in discrete areas or over the whole surface, whereby the hardness of the bronze-based alloy is reduced in these areas 9 and a hardness gradient is formed in radial direction according to arrow 8 (FIG. 1) of the anti-friction bearing element 1, whereby the hardness increases from the anti-friction surface 6 in the direction of the back side 7 of the anti-friction bearing element 1. In the preferred embodiment of the anti-friction bearing element 1 the anti-friction bearing layer 2 thus consists of a single bronze-based alloy, which has different hardnesses.

The heat treatment can generally be performed by means of a suitable device. Preferably, the heat treatment is performed by means of a laser or by induction heating, as in this way in particular the discrete areas 9 can be produced more precisely and simply.

The heat treatment can be performed in a heat treatment device, which comprises the laser or the induction heating device or consists of the latter, whereby the laser or the induction heating device during the heat treatment sweeps over the surface of the bronze-based alloy at a speed which is selected from a range of from 1 m/min to 8 m/min, in particular at a speed which is selected from a range of 1 m/min to 4 m/min. Depending on this speed and in association with the energy which is introduced into the bronze-based alloy in areas 9 or area 9, in this way the layer depth 17 of the area or area(s) 9 can be defined. At these parameters also the grain size of the bronze-based alloy can be determined in the area or areas 9.

The laser treatment can be selected for example with a right-angled laser focus from a range of 0.5 mm×10 mm to 0.54 mm×20 mm or also with a circular laser focus from a diameter range of 0.5 mm to 20 mm.

The power density of the laser treatment can be selected from a range of 0.1 $kW/mm^2$ to 0.8 $kW/mm^2$, in particular from a range of 0.2 $kW/mm^2$ to 0.4 $kW/mm^2$.

The output for the induction heat treatment can be selected from a range of 5 kW to 35 kW at a frequency from a range of 10 kHz to 750 kHz.

The area 9 or the areas 9 have in particular a layer depth 17 in radial direction which is selected from a range with a lower limit of 0.25 mm to 5 mm, in particular selected from a range of 0.5 mm to 3 mm.

In general this layer depth 17 can be between 1% and 75%, in particular between 5% and 35%, of the anti-friction bearing thickness in radial direction.

According to one embodiment variant of the method it is possible that at least in one area close to the surface, which can be between 2% and 100% of the layer depth 17, during the heat treatment an additional alloy element or element compounds are introduced into the bronze-based alloy. In addition at least one additional alloy element or an additional element compound can be introduced for example in wire form or powdered form into the area 9 to be treated. With the formation of several areas 9 it is also possible that only individual or only one of these areas 9 is provided with the additional alloy element.

For example the tribologically active elements bismuth, lead and carbon can be used as the additional alloy element. For example the tribologically active compounds can be used as an additional element compounds on the basis of aluminium oxides (e.g. $Al_2O_3$), silicon carbides (e.g. SiC) or molybdenum sulphides (e.g. $MoS_2$). It is thus possible to alloy the part layer 4 of the homogenous anti-friction bearing layer 2 and change it into a heterogeneous structural state. Bearing materials similar to lead in lead bronzes or tin in aluminium tin use said elements or the element compounds as solid lubricants and thereby increase the anti-frictional property of the part layer 4 in the case of mixed friction.

To adapt the anti-friction bearing element 1 more effectively to the intended purpose it is possible according to another variant of the method, that the anti-friction bearing load is simulated on an electronic data processing system, in that in this way the pressure distribution is determined and in that afterwards the hardness gradient is adjusted to the pressure distribution. Electronic data-processing programs and simulation algorithms for simulating the anti-friction bearing load are known from the prior art. For example, in addition hydrodynamic (HD) and/or elastically-hydrodynamic (DAD) calculation methods are used.

By means of the heat treatment a structural change is achieved in the area or areas 9, resulting in the reduction of the hardness compared to the basic hardness of the bronze-based alloy. In particular a rolled structure is converted into a cast structure.

By means of the heat treatment the grain size of the grains of the bronze-based alloy can be changed. In this case tests have shown that the maximum grain size of the not heat-treated areas 11 (or sections) should not exceed a value of 30 μm, in particular 20 μm. Preferably, the heat-treated area(s) 9 has or have a grain size of a maximum of 1,000 μm, in particular a maximum of 300 μm.

To achieve the preferred grain size of the non-heat-treated areas 11 (or sections) in addition the structure can be achieved with maximum average grain size of 30 μm mentioned in the preceding section also by the addition of grain refiners, as described above.

It should be noted at this point that instead of the heat treatment it is also possible to make the anti-friction bearing element 1, i.e. its anti-friction bearing layer 2, from at least two different bronze-based alloys, which have a different hardness from one another, whereby the softer bronze-based alloy is provided in the areas 9. Preferably, the anti-friction bearing layer is made from only one single bronze-based alloy, which is subjected to a heat treatment, as explained above.

Alternatively or also in addition to the processes mentioned in the preceding paragraphs, also a subsequent mechanical or a material-removing processing can be performed. Methods known from the prior art are possible processing methods, e.g. grinding or fine turning the surface.

The back metal layer according to the invention can be used in particular for producing anti-friction bearing elements 1 in ship diesel engines, in so-called high-speed-runners, in engines for lorries, in high-pressure compressors or also in the bearing points of wind power stations.

Figure 7:
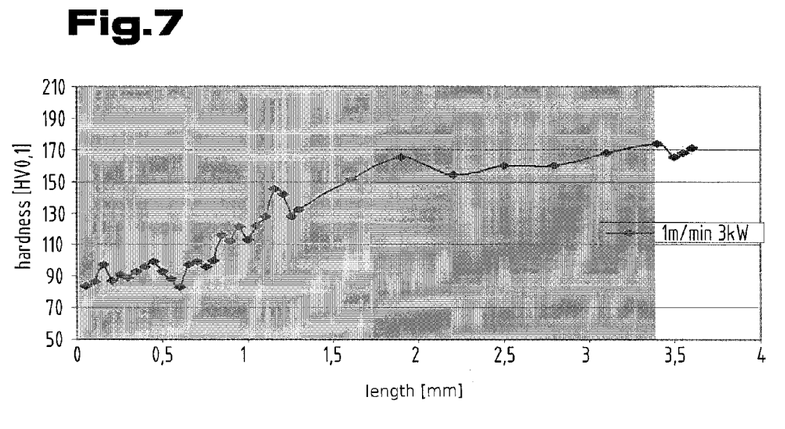
FIG. 7-FIG. 10 show various different hardness paths.
Figure 8:
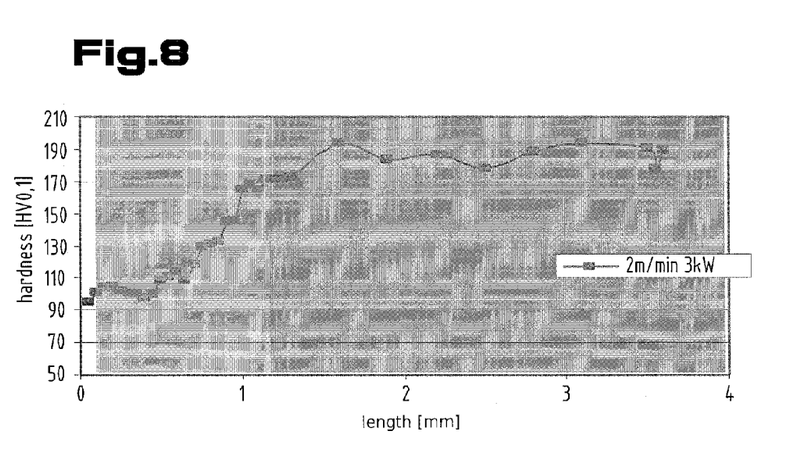
Figure 9:
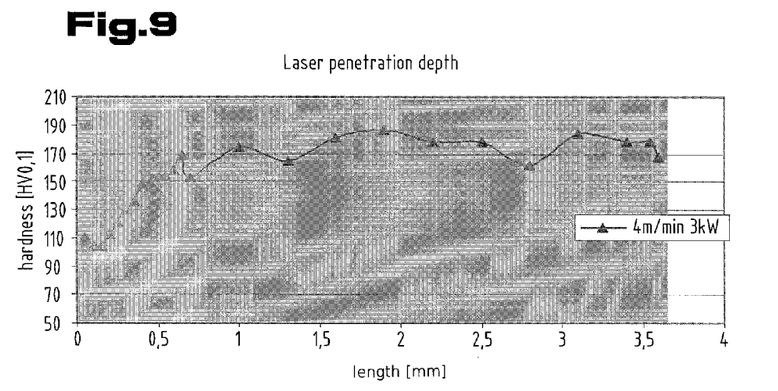

FIGS. 7 to 9 show three different hardness paths, i.e. hardness gradients, which were achieved by means of heat treatment in the areas 9 (e.g. FIG. 6). The bronze based alloy had a composition of 5 wt. % tin, 1.5 wt. % zinc, 0.5 wt. % sum of trace elements consisting of phosphorus, manganese, nickel, cobalt, titanium and remainder of copper.

The heat treatment was performed by means of a laser. The power density in all three tests was 0.3 kW/mm². The laser focus had a size of 1 mm×10 mm.

The hardness gradient according to FIG. 7 was formed at a treatment speed, i.e. a speed at which the laser swept over the surface to be treated, of 1 m/min, that of FIG. 8 with a treatment speed of 2 m/min and that of FIG. 9 with a treatment speed of 4 m/min.

In the diagrams the white areas on the left show the depth, up to which the bronze-based alloy was melted on by the heat treatment, the adjoining light-grey areas show the depth, up to which the bronze-based alloy was influenced by the heat treatment, however was not melted thereon, and the adjoining dark-grey areas the depth of the anti-friction surface 6 was measured, from which the bronze-based alloy is unchanged in the original form, i.e. with the original structure.

It can also be seen from a comparison of the hardness paths that the heat-influenced areas, i.e. the light-grey areas, become smaller with increasing treatment speed, i.e. the layer depth 17 (e.g. FIG. 6) of the areas 9 is reduced. As a result in this way the hardness gradient can be configured to be steeper. In addition, in this way the hardness of the areas 9 on the anti-friction surface 6 itself can also be varied, in that at a higher treatment speed the reduction in hardness is lower, i.e. the surface of the treated areas 9 is even harder.

Figure 10:
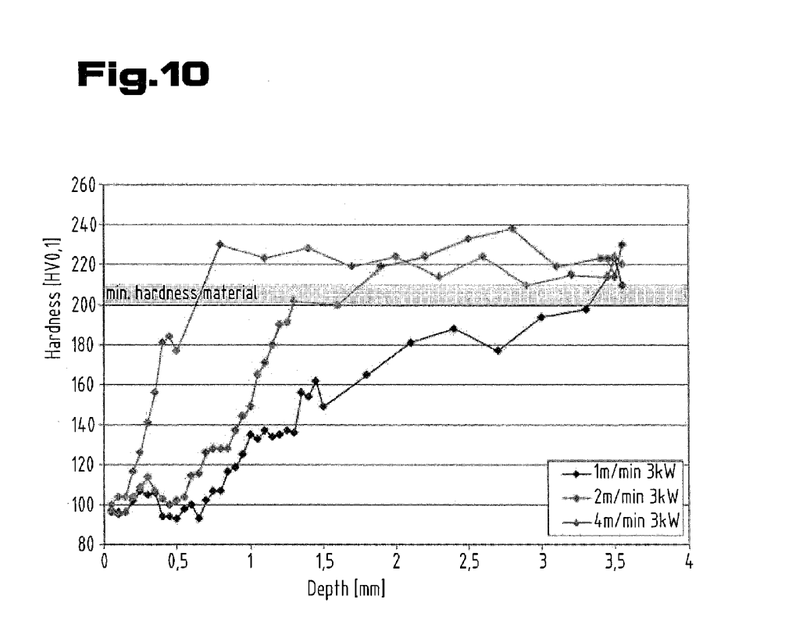

To clarify these effects FIG. 10 shows three hardness paths of a different exemplary embodiment.

In general, the bronze-based alloy in the non-heat-treated areas 11 (e.g. FIG. 2) can have a Vickers hardness of between 160 HV 0.1 and 240 HV 0.1, in particular between 170 HV 0.1 and 200 HV 0.1.

The hardness of the heat-treated areas 9 can be on the surface, i.e. on the anti-friction surface 6 (FIG. 1) between 80 HV 0.1 and 110 HV 0.1, in particular between 90 HV 0.1 and 100 HV 0.1.

The hardness gradient can be between 35 HV 0.1/mm layer depth 17 and 190 HV 0.1/mm layer depth 17, in particular between 45 HV 0.1/mm layer depth 17 and 110 HV 0.1/mm layer depth 17.

Said hardness values can also be applied to the embodiment variant of the anti-friction bearing element 1 with an anti-friction bearing layer 2 formed by two part layers 3, 4.

The exemplary embodiments show possible embodiment variants of the anti-friction bearing element 1, whereby it should be noted at this point that also various combinations of the individual embodiment variants with one another are possible and this variability lies within the expertise of a person skilled in this technical field on the basis of the teaching on technical procedure.

Lastly, as a point of formality, it should be noted that for a better understanding of the structure of the anti-friction bearing element 1 the latter and its components have been represented partly untrue to scale and/or enlarged and/or reduced in size.

The invention claimed is:

1. An anti-friction bearing element with a carrier metal which forms a back side of the anti-friction bearing element, and a bearing metal, wherein the carrier metal is made from a first bronze-based alloy, wherein the bearing metal is made from a second bronze-based alloy, wherein said first and second bronze-based alloys have a hardness gradient with increasing hardness in the direction of the back side of the anti-friction bearing element, and wherein the hardness gradient is formed up to a layer depth which is selected from a range of 0.5 mm to 5 mm.

2. The anti-friction bearing element according to claim 1, wherein the carrier metal and the bearing metal are configured in a single layer and are formed by a single bronze-based alloy comprising the first and second bronze-based alloys.

3. The anti-friction bearing element according to claim 1, wherein on an anti-friction surface of the second bronze-based alloy opposite the back side in a direction of a radial bearing cross section a running-in layer or an anti-friction paint layer is provided.

4. The anti-friction bearing element according to claim 1, wherein longitudinal side surfaces of the anti-friction bearing surface have a hardness gradient that is formed with a greater layer depth than a middle area of the anti-friction bearing surface.

5. An anti-friction bearing element comprising a carrier metal which forms a back side of the anti-friction bearing element, and a bearing metal, wherein the carrier metal is made from a first bronze-based alloy, wherein the bearing metal is made from a second bronze-based alloy, wherein said first and second bronze-based alloys have a hardness gradient with increasing hardness in the direction of the back side of the anti-friction bearing element, and wherein the hardness gradient is formed only in discrete areas.

6. The anti-friction bearing element according to claim 5, wherein the discrete areas are in the form of strips.

7. An anti-friction bearing element with a carrier metal which forms a back side of the anti-friction bearing element, and a bearing metal, wherein the carrier metal is made from a first bronze-based alloy, wherein the bearing metal is made from a second bronze-based alloy, wherein said second bronze-based alloy has a hardness gradient with increasing hardness in the direction of the back side of the anti-friction bearing element, and wherein the second bronze-based alloy comprises a rolled structure and at least one heat-treated area with a cast structure formed by conversion of the rolled structure via a heat treatment process into the cast structure so that the second bronze-based alloy with the exception of the at least one heat-treated area has the rolled structure and in the at least one heat-treated area has the cast structure, the cast structure having a reduced hardness relative to the rolled structure.

8. The anti-friction bearing element according to claim 7, wherein the second bronze-based alloy has a grain size of a maximum of 1,000 μm in the at least one heat-treated area.

* * * * *

UNITED STATES PATENT AND TRADEMARK OFFICE
CERTIFICATE OF CORRECTION

PATENT NO.         : 8,845,199 B2                                   Page 1 of 1
APPLICATION NO.    : 13/495068
DATED              : September 30, 2014
INVENTOR(S)        : Haedicke et al.

It is certified that error appears in the above-identified patent and that said Letters Patent is hereby corrected as shown below:

In the Claims

In Column 16, Line 52 (Line 1 of Claim 1) after the word "element" please change "with" to correctly read: -- comprising --.

In Column 18, Line 1 (Line 1 of Claim 7) after the word "element" please change "with" to correctly read: -- comprising --.

Signed and Sealed this
Twentieth Day of January, 2015

Michelle K. Lee
*Deputy Director of the United States Patent and Trademark Office*